Figure 1:
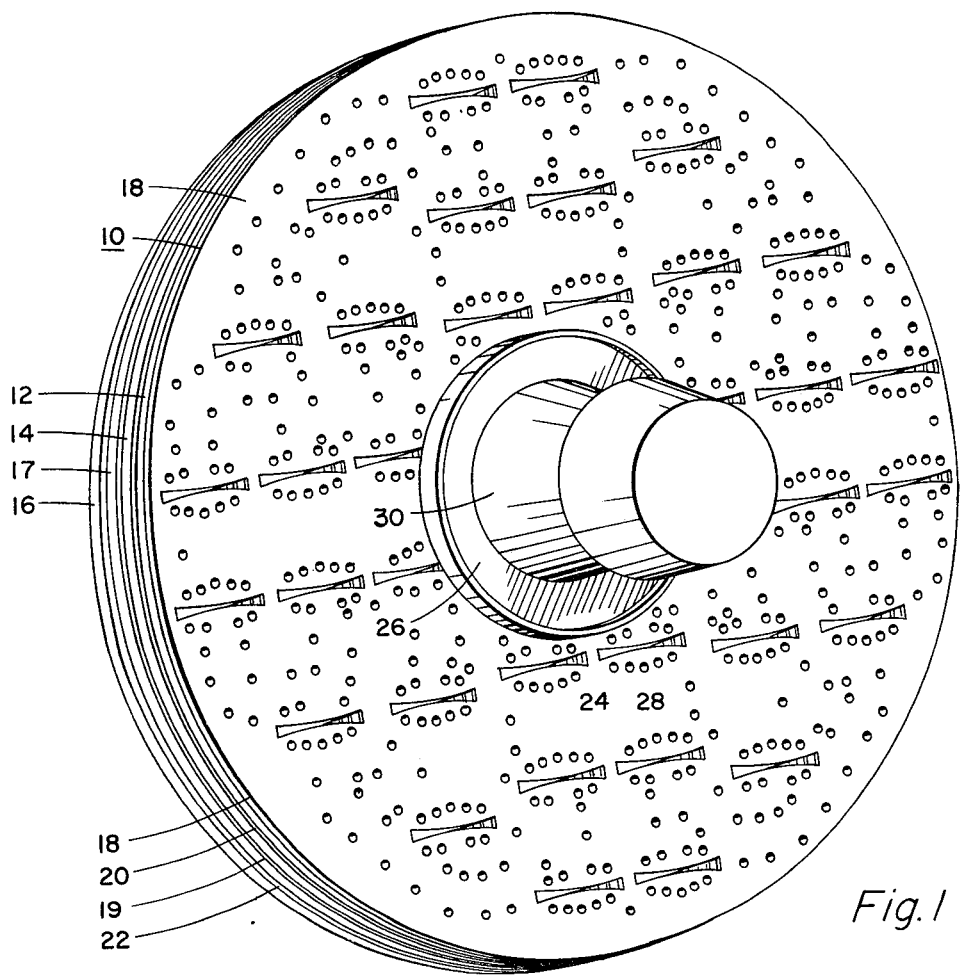

United States Patent
Johnson

[15] 3,701,158
[45] Oct. 24, 1972

[54] DUAL MODE WAVE ENERGY TRANSDUCER DEVICE

[72] Inventor: Robert Henry Johnson, Scottsdale, Ark.

[73] Assignee: Motorola, Inc., Franklin Park, Ill.

[22] Filed: Jan. 22, 1970

[21] Appl. No.: 4,975

[52] U.S. Cl. .................343/725, 343/770, 343/853
[51] Int. Cl. .............................................H01q 13/01
[58] Field of Search......343/720, 753, 754, 755, 840, 343/909, 770, 725, 770, 853

[56] References Cited

UNITED STATES PATENTS

| | | | |
|---|---|---|---|
| 2,895,127 | 7/1959 | Padgett | 343/840 |
| 3,109,988 | 11/1963 | Hoover | 343/770 |
| 3,524,151 | 8/1970 | Safran | 343/754 |

*Primary Examiner*—Eli Lieberman
*Attorney*—Mueller, Aichele & Gillman

[57] ABSTRACT

A compact, efficient and inexpensive unitary structure comprising a circular conductive sheet having dipole slots therein and a transducer device operative at a wavelength different than that of the dipole slots centered on the sheet and fixed thereto and extending perpendicular to the sheet is disclosed for sensing both radio waves reflected from a target and infrared or other rays emanating from the target.

9 Claims, 5 Drawing Figures

PATENTED OCT 24 1972

3,701,158

SHEET 1 OF 3

INVENTOR.
Robert Henry Johnson

BY
Mueller, Aichele & Rauner

ATTY'S.

3,701,158

DUAL MODE WAVE ENERGY TRANSDUCER DEVICE

BACKGROUND

This invention relates to a unitary structure for sensing radio waves reflected from a target and for sensing infrared or other rays emitted from the target.

When tracking a target, radio waves are transmitted in the general direction of the target and the direction of and distance to the target can be determined by noting the direction from which the reflected waves are received and also the time it takes the transmitted waves to travel to the target and back to the position of the transmitter. Most targets, due, for example, to their propulsive equipment, also emit infrared rays. The direction to the target can be detected by picking up the emitted infrared rays and lining up the infrared ray pickup device for maximum output. Unitary structures are known which include an infrared receptor and a directional antenna. However, such known means are bulky and expensive and if the infrared sensor is centered with respect to the directional antenna, the centering may require cutting out or blanking out the central part of the antenna, whereby the infrared sensor interferes with the operation of the antenna.

It is an object of this invention to provide an improved, combined sensor means for radio waves and transducer for infrared ray waves or waves of other frequencies.

SUMMARY

According to this invention, a directional antenna comprises a plurality of dipole slots formed in a conductive sheet. The slots are parallel and so positioned as to be symmetrical with respect to two orthogonally positioned center lines, whereby the slots of each group in a quadrant of the conductive sheet act as a sectorial antenna. If the center of the sheet has slots formed therein, they may be cut out and an infrared transducer or a transducer operating at other frequencies may be positioned in the cut out portion of the sheet or the center slots may be partially cut out and partially shielded by the transducer without, in any way, interfering with the operational mode of the directional antenna either as a transmitting antenna or as a receiving antenna. The antenna comprising the slots operates in the radar frequency range and the transducer operates in a desired frequency range such as in the infrared frequency range. Any known circuit which indicates direction in response to the waves picked up by the several quadrants of the sheet such as conical scan or monopulse seekers, may be connected thereto to indicate the direction to the target. Any known transmitter or detector which is sensitive to waves of any frequency range can be incorporated in the center of the sheet such as laser, ultraviolet or visible light sensors. Furthermore, transmission as well as reception means for other waves can be incorporated in the antenna center. Such a device may be called a transducer.

DESCRIPTION

Figure 2:
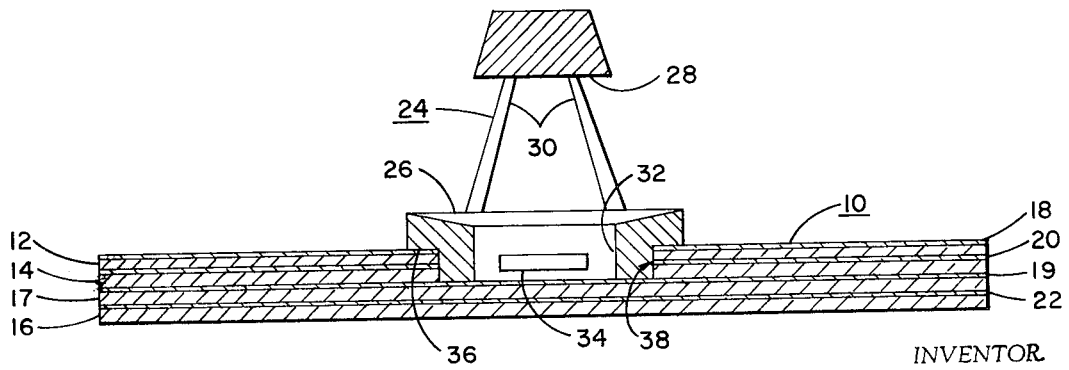
Figure 3:
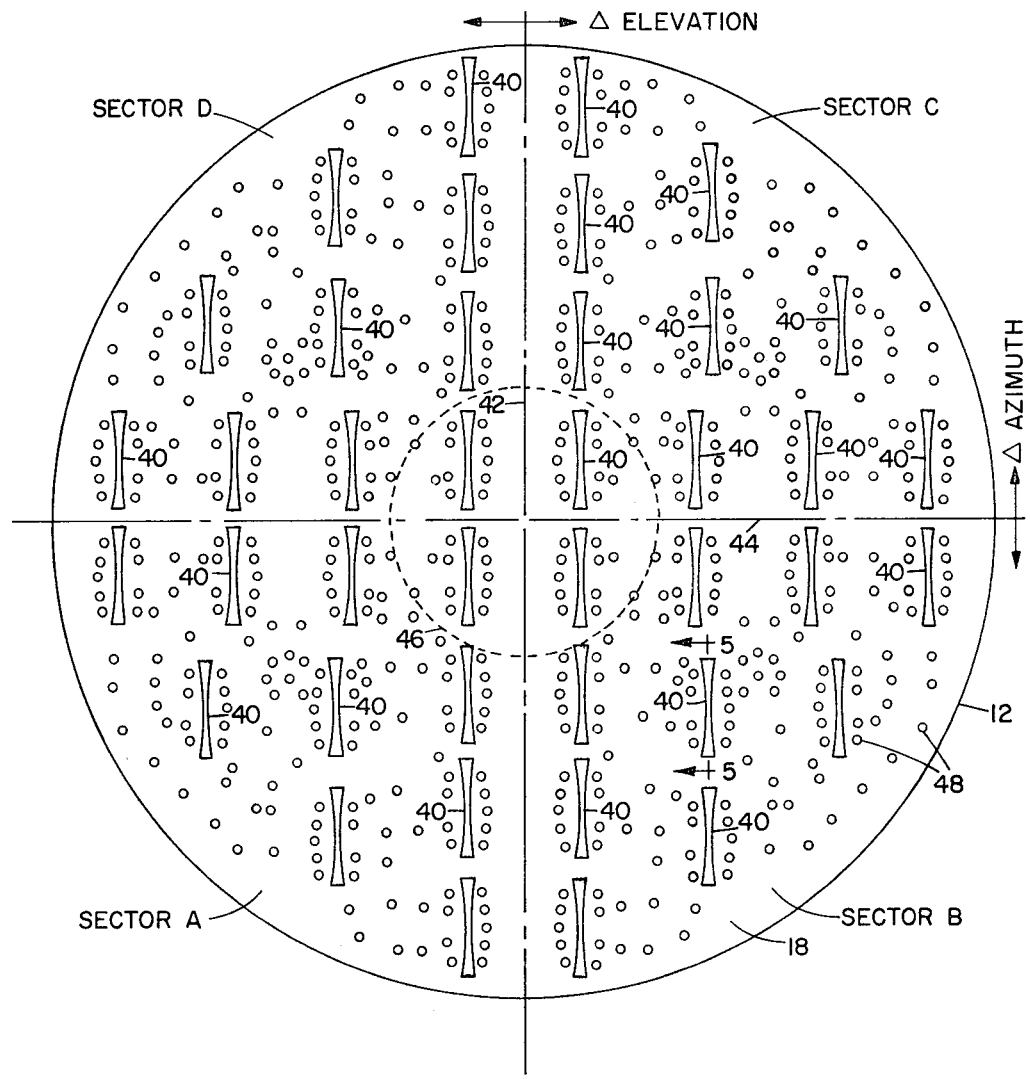
Figure 5:
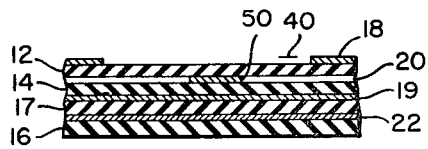
Figure 4:
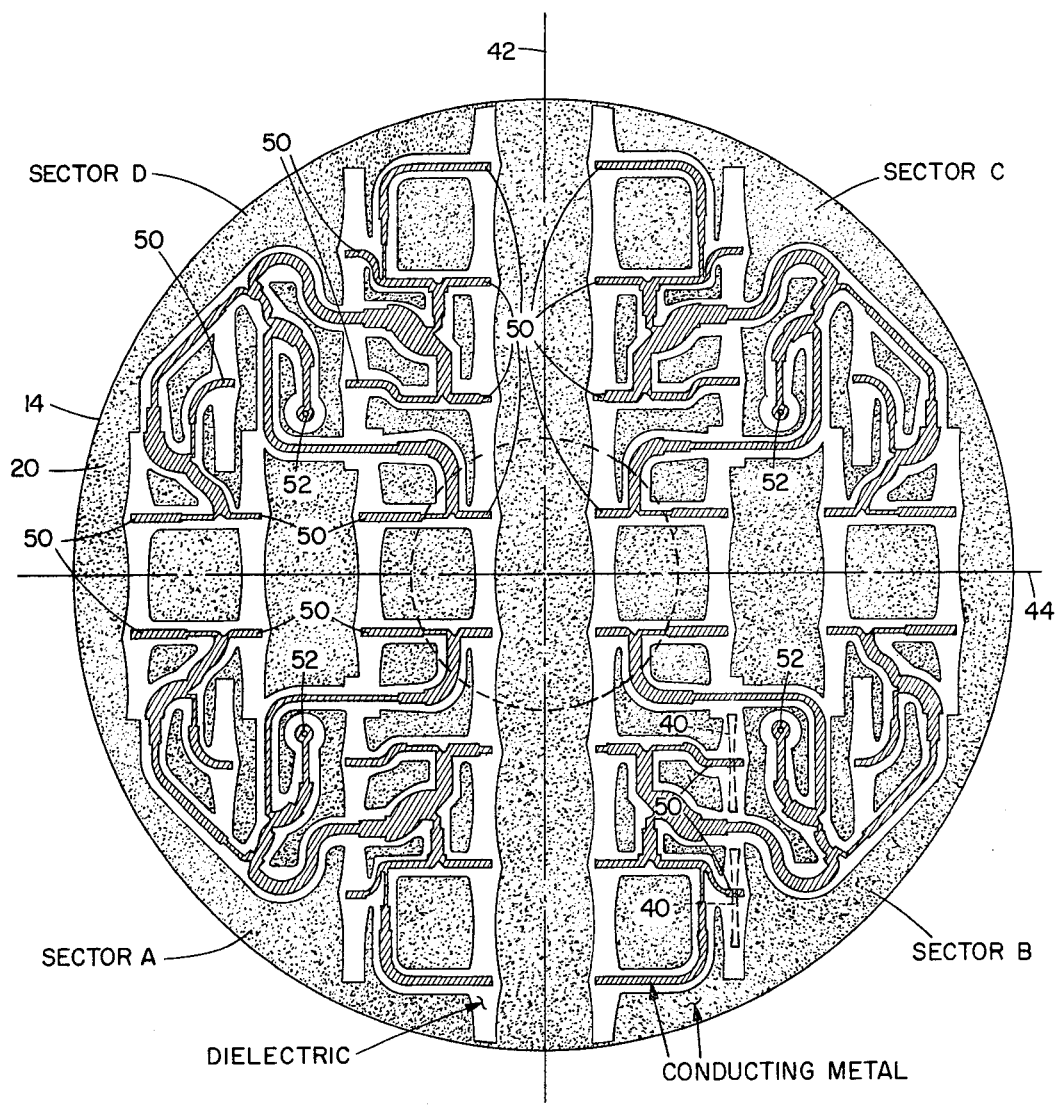

This invention will be better understood upon reading the following description in connection with the accompanying drawing in which FIG. 1 is a perspective view of the combined dual frequency range and mode sensor means of this invention, FIG. 2 is a vertical cross section of the sensor means of FIG. 1 through the center thereof, FIG. 3 is an elevational view of a printed circular circuit board including a conductive sheet on one side thereof having holes and slots therein comprising the directional antenna of FIG. 1, FIG. 4 is a printed circuit board, the board being of a size of the board of FIG. 3 and having registering electrical couplings therebetween for gathering the energy received in each sector of the antenna board, and FIG. 5 is a sectional view taken substantially in the direction of arrows 5—5 of FIG. 3.

Turning first to FIGS. 1 and 2, a composite board 10 is shown. The composite board 10 may comprise four printed circuit boards 12, 14, 17 and 16 concentrically mounted. The electrical circuits 18 and 20 are printed on the boards 12 and 14 as shown respectively in FIGS. 3 and 4. Board 17 is a ground plane. While the board 16 has printed thereon mixing and adding circuits 22, the details of these circuits are not shown since it is not considered that the circuits 22 are necessary for the understanding of this invention. FIGS. 1 and 2 also show the transducer (here an infrared pickup means 24) located at the center of the printed board of the printed circuit 18.

The infrared transducer 24 comprises a circular, concave segment of a spherical mirror 26 having a surface that will reflect infrared rays. Another mirror 28 which is planar is held at a distance from the mirror 26 by a support 30. The concave face of the mirror 26 and the flat face of the mirror 28 face each other and the centers of these two mirrors are in line and are perpendicular to the face of the sheet 12. The support 30 has provisions for passage of the infrared rays. A hole 32 is provided in the center of the mirror 26 to receive the waves from the mirror 28. An infrared sensitive element or infrared transmitting element 34 is positioned at the focus of the combination of the mirrors 26 and 28. When the axes of the mirrors 26 and 28 are pointed at a target that emits infrared radiation, the sensing element 34 (if used) provides a maximum indication in a known manner. The back portion 36 of the mirror 26 is shaped to fit a hole 38 in the boards 12 and 14 and to overlap to a certain extent, the printed circuit 18. The infrared transducer 24 is known, per se. It is noted that the axes of the transducer 24 and of the boards 12, 14, 16 and 17 are coincidental, whereby the axis of the device 24 is perpendicular to the boards 12, 14, 16 and 17 and that the central portions of the boards 12 and 14 are cut away and that a portion of the circuit 18 on the board 12, near the hole 38 therein, is shielded from radio waves by the structure of the pickup means 24.

The antenna arrays provided on the board 12 by the conductive layer 18, operate properly as a direction indicating antenna, even though much of the central portion thereof as well as the wave combining part of the layer 20, cannot be used. The directional antenna array is shown in FIG. 3 and the wave combining layer 20 is shown in FIG. 4. By the use of a flat directive antenna array and wave combining layer, such as that of FIGS. 1, 2, 3 and 4, the total depth of the dual wave energy transducer device that senses the energy in widely divergent wavelength ranges, such as radio waves and infrared rays, and that combines the radio waves in a directional manner, is usually shorter in axial direction than in radial direction, whereby the dual wave transducer is very compact. Since the antenna array and its connections are made by printed circuit techniques, the antenna and all wiring thereto, including mixers, hybrids and voltage dividers, are very compact and very inexpensive compared to the prior art use of separate antennas and hybrids and mixers using wave guide sections.

FIG. 3 shows the printed face or layer 18 of the board 12. The face 18 is a layer of copper having holes therein of shapes, sizes and positions to act as a four antenna arrays in individual quadrantal sectors A, B, C and D. Elongated slots 40 are each an antenna tuned by its length to the waves to be transmitted and received thereby. The slots 40 are produced in the copper layer comprising the face 18 by known printed circuit techniques. The opposite ends of the slots 40 are widened out slightly to improve transmission and reception characteristics. The slots 40 to the left of the center line 42 and below the center line 44, as viewed in FIG. 3, are connected, as will be explained, to add the waves received thereby to provide a first sectorial antenna array A. Similarly, the slots to the right and below the center lines 42 and 44 are connected to add waves received thereby, producing a second sectorial array B, and the slots to the right and above the center lines 42 and 44, and the slots to the left and above the center lines 42 and 44, are connected to produce two further sectorial antenna arrays for the C and D, respectively. As is known, by comparing the strength of the waves received by the various sectorial antenna arrays, the direction in which to turn the board 12 to point the axis of the board at the target is indicated. As has been noted, the central portion of the board 12 is either cut away or shielded by the infrared pickup device 24, whereby the slots 40 inside a circle 46 of FIG. 3, are either cut out or are shielded from incoming waves. Yet with the use of the antenna array of FIG. 3, the lack of these four slots inside a circle 46, does not destroy or seriously affect the accuracy of directional determination given by the antenna arrays on the face 18 of the board 12. The circular holes 48 in the conductor comprising the face 18 of the board 12 as shown in FIG. 3, are provided and positioned to prevent undesired interaction between the sector combiners as well as slots 40, as by reflection from nearby objects including the metal surface between the slots 40 or adjacent slots 40. The holes 48 form no part of the subject invention and are therefore not disclosed any more fully. In actual structures, such holes would extend through the layers 18, 12, 14 and 19 to the nearest ground plane and connections would extend all the way through. The use of such holes is conventional and their operation is described in the Handbook of Tri-Plate Microwave Components published by Sanders Associates, Inc., in or about Nov. 1956. In ch. 6 of the said publication entitled "Antennas," the nature of such holes is described.

The operation of slots as antennas is also conventional at the present state of the art and the nature of their operation is set forth in the same chapter 6 of the Handbook of Tri-Plate Microwave Components. Further elaboration of the slots in the subject application is not believed necessary.

A printed circuit for combining the waves received in the slots 40 in the layer 18 and for combining them sectorially is shown in FIG. 4. FIG. 4 shows the face 20 of the board 14. In this figure, for clarity, the conducting metal strips 50, 52 have been shown cross-hatched and the remaining metal on the board 14 has been stippled thereby leaving unmarked the visible surface of the dielectric layer 12. When the face 20 of the board 14 is positioned adjacent the board 12, with the center lines 42 and 44, respectively, in line with each other, then the center of each slot 40 registers with an end 50 of a conductor, as shown for example, in sector B. The other end of the conductor in each sector A, B, C and D, leads to a connector 52 in that sector. Referring to FIG. 5, it will be seen that the slots 40 are in the metal film layer 18 on top of the assembly, and underneath the central portion of each slot 40 there is an end 50 of the printed combining circuit. As may be seen in FIG. 4, the widths of the strip conductors (cross-hatched) extending between ends 50 and the connector 52 in each sector are not uniform in width. The lengths and widths of the conductors between each end 50 and the connector 52 are selected to equalize the impedances between the ends 50 and the connector 52 in each sector, whereby all the waves received by the slots 40 in any one sector A, B, C or D, are added at the respective connector 52 without phase shift contributed by the circuits 50, 52 of printed circuit 20. A hole is provided for a pin in the center of each connector 52 for connection to corresponding connectors in the face 22 of the board 16 after passing through the ground plane board 17. The ground plane board 17 may be of insulating material having a layer of conductor 19 on a face thereof. The pins extend laterally of the boards 14, 17 and 16 and connect the connectors 52 in each sector A, B, C and D of the face 20 of the board 14 to a correspondingly positioned connector (not shown) in the face 22 of the board 16.

Referring to FIGS. 3, 4 and 5, when wave energy is received by any one of the slots 40, it is conveyed through the dielectric layer 12 and is picked up by the end of conductor 50 as may be seen in comparing FIGS. 4 and 5. In transmitting, that is when the slots are fed, energy is put into the strip conductors beginning with the connector 52 and terminating with the ends 50. The energy is conveyed from the ends 50 through the dielectric layer 12 and is radiated by the slots 40. All of the foregoing is well understood and is made evident from the reference to the Handbook of Tri-Plate Microwave Components.

After the waves received by each sector A, B, C and D of the antenna array on the board 12 have been combined by the printed circuit 20 on the board 14, they may be combined in any known manner to provide directional elevation and azimuth information. One way that this may be done using printed circuit techniques. That is, the printed circuit 22 on the circuit board 16 may include circuit means such as hybrids and mixers that are used to produce directional signals from the waves picked up by the slots 40. The circuit 22 is, therefore, not shown.

As has been noted above, many ways are known by which the energy received in the various sectors can be processed to give an elevational and an azimuth as well as a reference level information. While the energy picked up by the four slots 40 in the middle of FIG. 3 is lost in the described showing of the dual mode device, the accuracy of information produced thereby is not impaired thereby. However, if desired, other slots 40 may be added in each sector and the conductors 50 relocated to make up for these unused slots.

What is claimed is:

1. A combined radio frequency antenna array and an antenna for a substantially higher frequency band comprising a first substantially flat circuit board of a predetermined area and having a film layer of conducting material on one face thereof and a first layer of dielectric material immediately therebehind, said conducting film layer facing in the direction of energy transmission and reception, a plurality of slots of substantially the same dimensions in said conducting film layer forming an antenna array for transmitting and receiving radio waves of a certain wave length, said slots being positioned in different sectors of said board symmetrically with respect to the center lines of said board to produce several sectorial radio frequency antenna arrays, a second substantially flat circuit board comprising a second dielectric layer with sectorially arranged conducting film circuits thereon disposed with said sectorial circuits immediately against the dielectric material of said first circuit board, each one of said conducting film circuits being disposed behind a respective one of said arrays for receiving wave energy therefrom and transmitting radio frequency energy thereto, a connector in each of said sectors, the conducting film circuit in each sector having one end terminating adjacent each of the slots in said sector on the side of said first dielectric layer opposite to said slots and having the other end terminating at the connector in said sector, whereby the conducting film circuit in each sector picks up and adds together the wave energy from the slots in that sector only, and transmitting and receiving antenna means which operates with waves in a substantially higher frequency band than said radio frequency positioned at least in part in said area of said board, said higher frequency transmitting and receiving antenna having an axis which is perpendicular to the face of said board.

2. The combined antenna of claim 1 in which said area is central of said circuit board.

3. The combined antenna of claim 2 in which said higher frequency antenna means device operates with infrared waves.

4. The combined antenna of claim 3 in which said infrared ray higher frequency antenna means device has directional characteristics.

5. The combined antenna of claim 1 in which said slots are of dipole shape.

6. The combined antenna of claim 1 in which said slots are parallelly positioned with respect to each other.

7. The combined antenna according to claim 1 wherein said sectors are quadrants.

8. The combined antenna according to claim 7 wherein the conducting film circuits are printed circuit means.

9. The combined antenna of claim 7 in which a like plurality of slots are positioned in each quadrant.

* * * * *

UNITED STATES PATENT OFFICE
CERTIFICATE OF CORRECTION

Patent No. 3,401,158                              September 10, 1969

John G. Fisher et al.

It is certified that error appears in the above identified patent and that said Letters Patent are hereby corrected as shown below:

Columns 1 and 2, lines 24 to 29, the formula should appear as shown below:

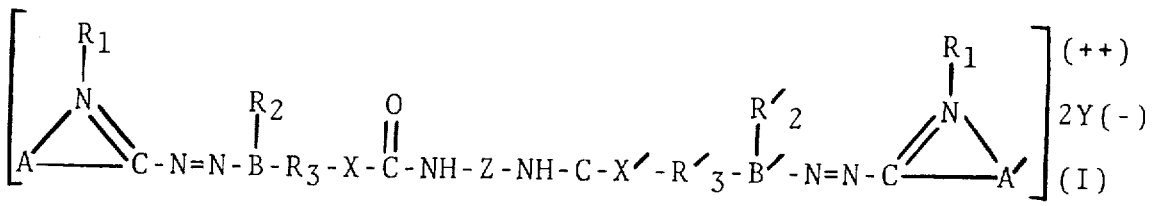

Column 1, line 35 "(III-diazonium" should read -- (III-diazonium --. Column 3, line 1, "VIII" should read -- VII --; lines 3 to 10, the formula should appear as shown below:

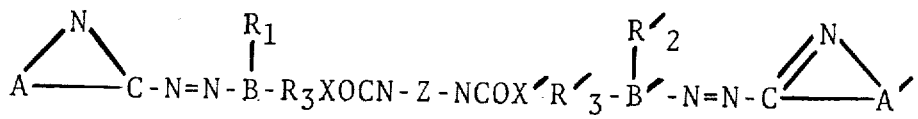

Columns 5 and 6, in each of the formulas of Examples 1, 2 and 3, "$2CH_3SO^-_4$" and "$2CH_3SO_5^-$" should read -- $2CH_3SO_4^-$ --. Column 12, lines 25 to 56, the formula should appear as shown below:

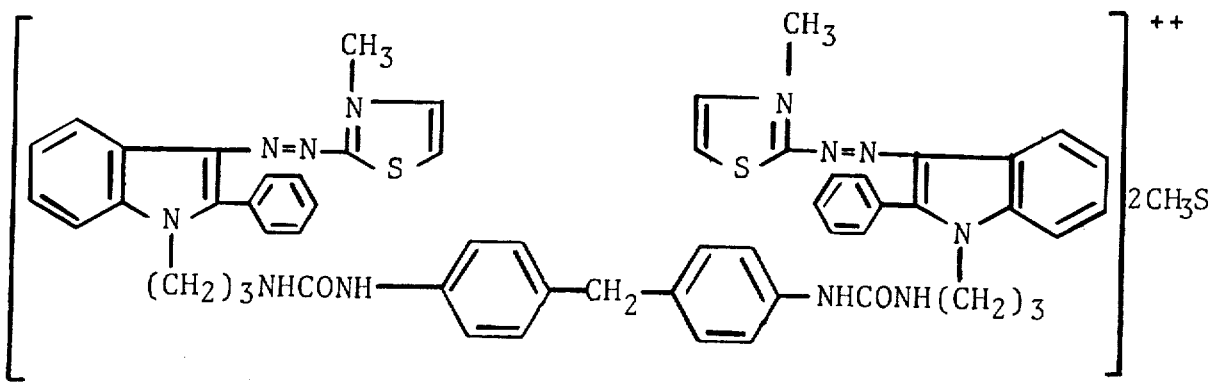

same column 12, lines 57 to 67, the formula should appear as shown below:

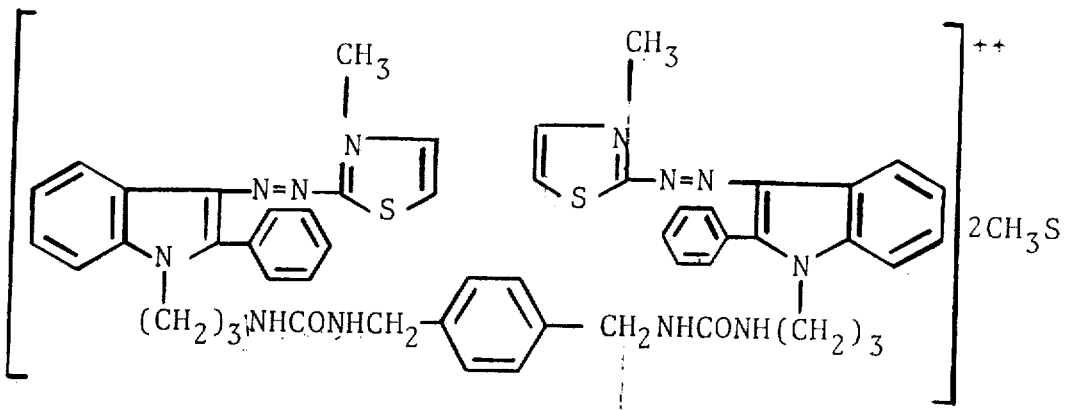

Signed and sealed this 10th day of March 1970.

(SEAL)
Attest:

EDWARD M. FLETCHER, JR.
Attesting Officer

WILLIAM E. SCHUYLER, JR
Commissioner of Patents

UNITED STATES PATENT OFFICE
CERTIFICATE OF CORRECTION

Patent No. 3,701,158  Dated October 24, 1972

Inventor(s) Robert Henry Johnson

It is certified that error appears in the above-identified patent and that said Letters Patent are hereby corrected as shown below:

The inventor's address, wherever it appears, should be changed from Scottsdale, Ark. to Scottsdale, Ariz.

Signed and sealed this 8th day of May 1973.

(SEAL)
Attest:

EDWARD M. FLETCHER, JR.  ROBERT GOTTSCHALK
Attesting Officer  Commissioner of Patents